United States Patent
Fujiki

(10) Patent No.: US 10,603,855 B2
(45) Date of Patent: Mar. 31, 2020

(54) TIRE VULCANIZATION MOLD AND MANUFACTURING METHOD THEREOF

(71) Applicant: Toyo Tire & Rubber Co., Ltd., Itami-shi, Hyogo (JP)

(72) Inventor: Kuniko Fujiki, Itami (JP)

(73) Assignee: TOYO TIRE CORPORATION, Itami-shi (JP)

( * ) Notice: Subject to any disclaimer, the term of this patent is extended or adjusted under 35 U.S.C. 154(b) by 0 days.

(21) Appl. No.: 16/178,060

(22) Filed: Nov. 1, 2018

(65) Prior Publication Data

US 2019/0152178 A1   May 23, 2019

(30) Foreign Application Priority Data

Nov. 22, 2017   (JP) .................. 2017-224761

(51) Int. Cl.
  *B29D 30/06*   (2006.01)
  *B29C 33/38*   (2006.01)

(52) U.S. Cl.
  CPC ...... *B29D 30/0606* (2013.01); *B29C 33/3842* (2013.01); *B29D 2030/0613* (2013.01); *B29D 2030/0617* (2013.01)

(58) Field of Classification Search
  CPC ........ B29D 30/0606; B29D 2030/0613; B29D 2030/0617; B29C 33/3842
  See application file for complete search history.

(56) References Cited

U.S. PATENT DOCUMENTS

| 3,553,790 A * | 1/1971 | Brobeck et al. ........ B29C 33/10 |
| | | 425/35 |
| 10,357,930 B2 * | 7/2019 | Ishihara .................. B29C 35/02 |

FOREIGN PATENT DOCUMENTS

| JP | 61-291205 A | | 12/1986 |
| JP | 10-128755 | * | 5/1998 |
| JP | 2013-75593 | * | 4/2013 |
| JP | 2014-151518 | * | 8/2014 |

* cited by examiner

*Primary Examiner* — James P MacKey
(74) *Attorney, Agent, or Firm* — Westerman, Hattori, Daniels & Adrian, LLP

(57) ABSTRACT

A tire vulcanization mold 10 has a plate-like sipe blade 26 used to form a sipe in a tread portion of a pneumatic tire. The sipe blade 26 protrudes to a mold inner side from a mold inner surface 30, and is provided with a through-hole 28 drilled to penetrate through the sipe blade 26. An acute angle portion is formed between a surface 29a of the through-hole 28 on the mold inner side and a surface 27 of the sipe blade 26, and a diameter of the through-hole 28 is larger than 1 mm.

2 Claims, 14 Drawing Sheets

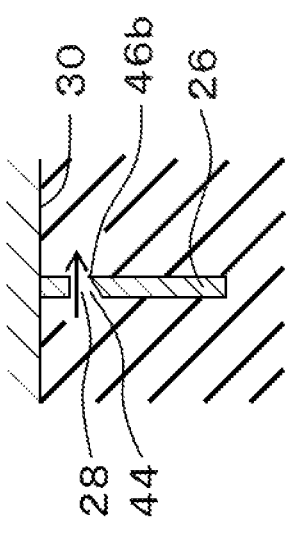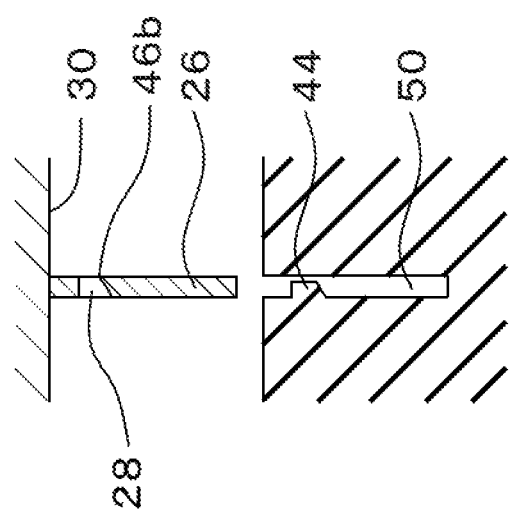
Fig. 12A
Fig. 12B

TIRE VULCANIZATION MOLD AND MANUFACTURING METHOD THEREOF

REFERENCE TO RELATED APPLICATION

The present application is based on Japanese Patent Application No. 2017-224761 (filing date: Nov. 22, 2017) and claims the benefit of Japanese Patent Application No. 2017-224761. The entire subject matter of Japanese Patent Application No. 2017-224761 is hereby incorporated herein by referring to Japanese Patent Application No. 2017-224761.

TECHNICAL FIELD

The present invention relates to a tire vulcanization mold and a manufacturing method thereof.

BACKGROUND ART

A plate-like sipe blade is provided inside a tire vulcanization mold to form a sipe in a tread portion of a pneumatic tire. As is shown in FIG. 14A, through-holes 228 are drilled in a sipe blade 226 to let air and rubber pass through during vulcanization molding.

As is indicated by an arrow in FIG. 14B, rubber fills in the through-hole 228 during vulcanization molding, when the mold is opened to remove a tire after the rubber sets, as is shown in FIG. 14C, rubber 244 in the through-hole 228 may possibly be torn off and remain in the through-hole 228. In such a case, the rubber 244 may later fall into the mold and adhere to an unvulcanized tire before subjected to vulcanization molding, thereby making the tire defective. The rubber 244 remaining in the through-hole 228 raises a problem particularly in a case where the mold is a so-called two-piece mold formed of an upper mold and a lower mold because when the rubber 244 falls, it often stays on top of the lower mold.

In addition, cracking occurs in a sipe edge in some cases when rubber in a through-hole is torn off. A countermeasure proposed to eliminate this inconvenience is to provide a difference in diameter or a step to the through-hole (see, for example, JP-A-61-291205).

SUMMARY OF THE INVENTION

Problems that the Invention is to Solve

An object of the present invention is to provide a tire vulcanization mold having a sipe blade provided with a through-hole in which rubber hardly remains when a tire is removed, and a manufacturing method thereof.

Means for Solving the Problems

A tire vulcanization mold according to one embodiment has a plate-like sipe blade used to form a sipe in a tread portion of a pneumatic tire. The sipe blade protrudes to a mold inner side from a mold inner surface, and is provided with a through-hole drilled to penetrate through the sipe blade. The tire vulcanization mold is characterized in that an acute angle portion is formed between a surface of the through-hole on the mold inner side and a surface of the sipe blade, and that a diameter of the through-hole is larger than 1 mm.

A manufacturing method of a tire vulcanization mold according to one embodiment includes providing a sipe blade used to form a sipe in a tread portion of a pneumatic tire by drilling a through-hole in a flat plate formed into the sipe blade and providing the plate to protrude to a mold inner side from a mold inner surface. The manufacturing method is characterized in that an acute angle is produced between a surface of the through-hole on the mold inner side and a surface of the sipe blade by drilling the through-hole by passing a drill through the plate diagonally with respect to the surface of the plate or by passing only a tapered portion at a tip end of the drill through the plate.

Advantage of the Invention

Owing to the characteristics as above, the tire vulcanization mold according to one embodiment has an advantage that rubber hardly remains in the through-hole Of the sipe blade when a tire is removed. Also, a tire vulcanization mold having the characteristics as above can be manufactured by the manufacturing method of a tire vulcanization mold according to one embodiment.

BRIEF DESCRIPTION OF THE DRAWINGS

FIG. 7 is a view showing a method of drilling the through-hole 28a;

FIGS. 12A and 12B are views used to describe a manner in which the sipe blade 26 is extracted from a tire after vulcanization molding, FIG. 12A being a view showing a state during vulcanization molding and FIG. 12B being a view showing a state when the sipe blade 26 is extracted from a sipe 50;

MODE FOR CARRYING OUT THE INVENTION

Figure 1:
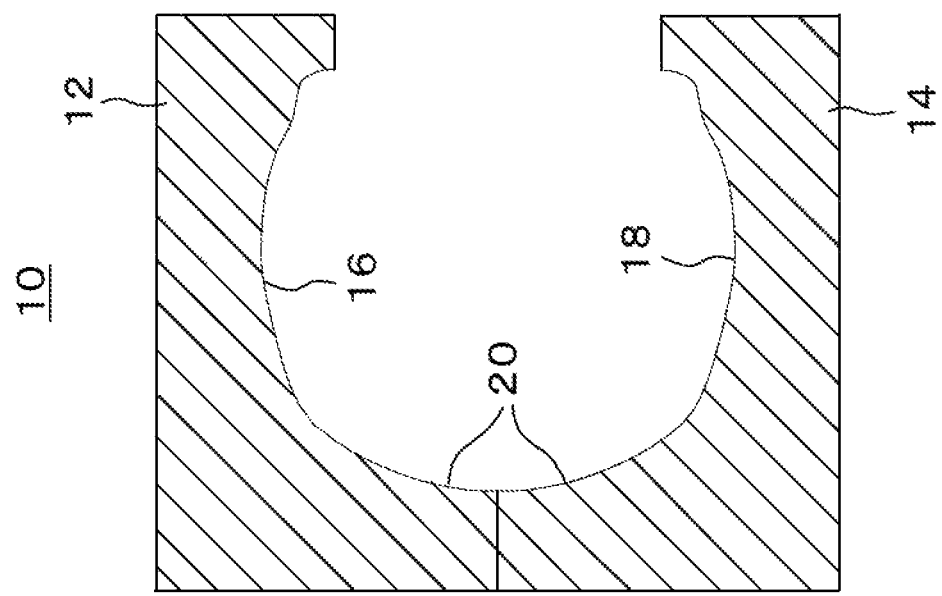
FIG. 1 is a half sectional view of a tire vulcanization mold 10.

A present embodiment will be described according to the drawings. It should be appreciated that the present embodiment is a mere example and any change made as needed without deviating from the gist of the present invention is included within the scope of the present invention. In the drawings, a length, a shape, or the like may be exaggerated or represented schematically for ease of description. It should be appreciated, however, that the drawings are mere an example and by no means limit an interpretation of the present invention.

1. Structures of Tire Vulcanization Mold 10 and Sipe Blade 26

FIG. 1 shows a tire vulcanization mold 10 of one embodiment. The tire vulcanization mold 10 has an upper mold 12 and a lower mold 14. The upper mold 12 has an upper-side molding portion 16 which is a recess opening downward. The lower mold 14 has a lower-side molding portion 10 which is a recess opening upward. During vulcanization molding, an unvulcanized tire is set on the lower side molding portion 18 and covered by the upper mold 12 from above. The upper-side molding portion 16 shapes the tire on one side in a tire width direction (upper side during vulcanization molding) and the lower-side molding portion 18 shapes the tire on the other side in the tire width direction (lower side during vulcanization molding).

Figure 2:
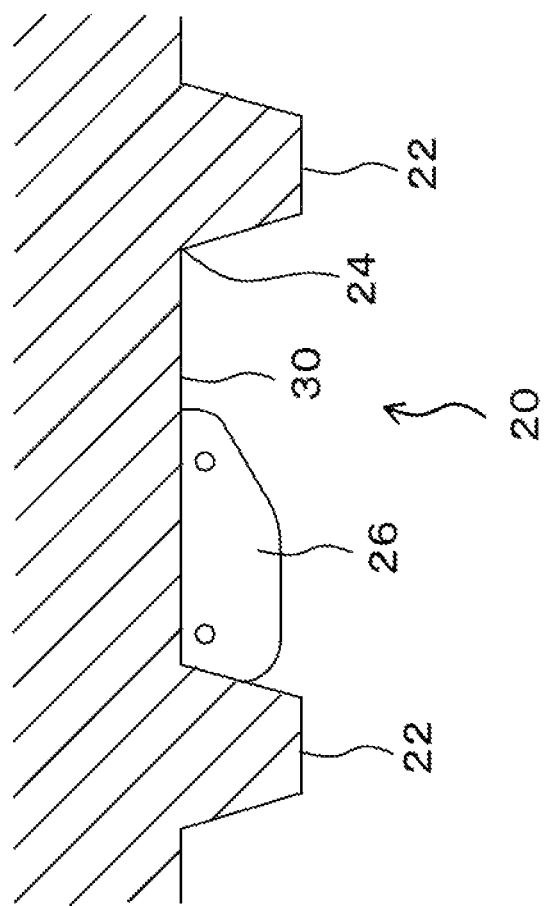
FIG. 2 is an enlarged view of a tread molding portion 20.
Figure 3:
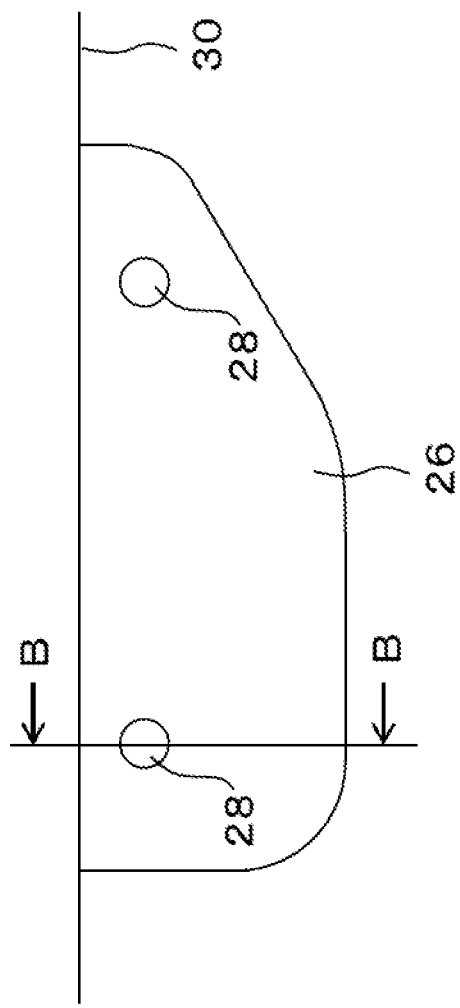
FIG. 3 is a front view of a sipe blade 26.

The upper-side molding port on 16 and the lower-side molding portion 18 each have a tread molding portion 20 which shapes a tread portion of a pneumatic tire. As is shown in FIG. 2 the tread, molding portion 20 is provided with protrusions 22 used to form grooves in the tread portion and a recess 24 used to form a block and a rib. The recess 24 enclosed by the protrusions 22. A sipe blade 26 used to form a sipe in the tread portion is provided in the recess 24. The sipe blade 26 protrudes to a mold inner Side from a mold inner surface in a direction orthogonal to the mold inner surface 30 (see FIG. 4 through FIG. 6).

Figure 4:
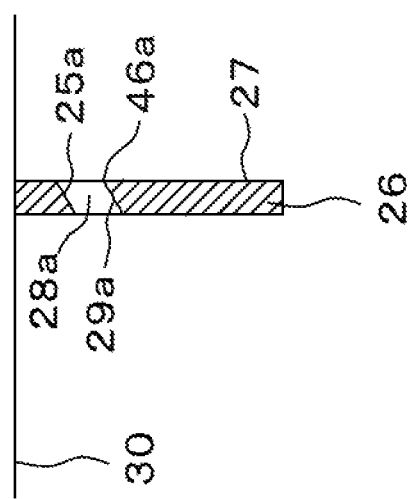
FIG. 4 is a sectional view taken along the line B-B of FIG. 3 and showing a through-hole 28a of the sipe blade 26.
Figure 5:
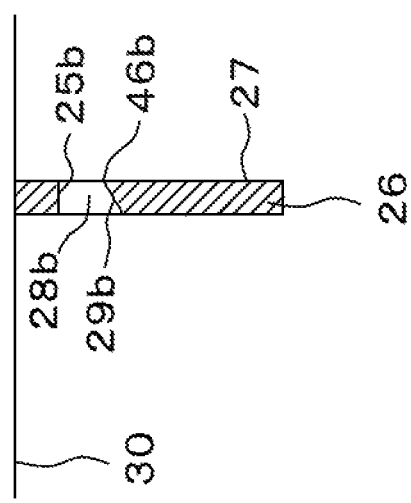
FIG. 5 is a sectional view taken along the line B-B of FIG. 3 and showing a through-hole 28b of the sipe blade 26.
Figure 6:
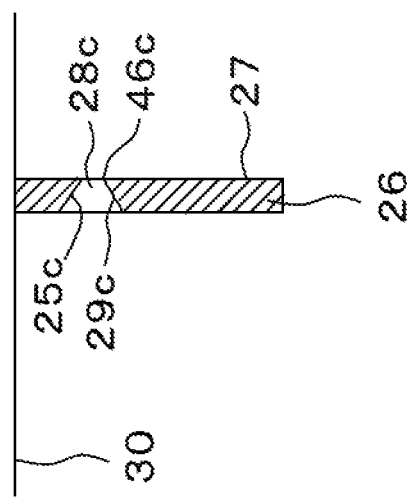
FIG. 6 is a sectional view taken along the line B-B of FIG. 3 and showing a through-hole 28c of the sipe blade 26.

The sipe blade 26 is a plate-like member having a predetermined thickness. As are shown in FIG. 3 through FIG. 6, the sipe blade 26 is provide with through-holes 28 drilled to penetrate through the sipe blade 26 in a thickness direction. The number of the through holes drilled in a single sipe blade 26 is not limited and two through-holes 28 are drilled in an example of FIG. 3. An acute angle portion is formed between a surface of the through-hole 28 on the mold inner side and a surface 27 of the sipe blade 26. Specific examples of the through-hole configured as above are shown in FIG. 4 through FIG. 6.

According to a specific example of FIG. 4, a through-hole 28a having a constant diameter extends at an angle with respect to the surface 27 of the sipe blade 26 (hence at an angle with respect to the mold inner surface 30, too). Accordingly, a surface 29a and a surface 25a of the through-hole 28a, respectively, on the mold inner side and a mold outer side are inclined with respect to the surface 27 of the sipe blade 26. An acute angle portion 46a is formed between the surface 29a of the through-hole 28a on the mold inner side and the surface 27 of the sipe blade 26. The phrase, "the surface on the mold inner side", referred to herein means an inner surface of the through-hole closer to a mold center. The phrase, "the surface on the mold outer side", referred to herein means an inner surface of the through-hole closer to the mold inner surface 30. In the present embodiment, "the surface on the mold inner side" and "the surface on the mold outer side" are curved surfaces.

FIG. 5 shows a through-hole 28b as another specific example. A surface 25b of the through-hole 28b on the mold outer side is orthogonal to the surface 27 of the sipe blade 26 and parallel to the mold inner surface 30. A surface 29b of the through-hole 28b on the mold inner side is inclined with respect to the surface 27 of the sipe blade 26. An acute angle portion 46b is formed between the surface 29b of the through-hole 28b on the mold inner side and the surface 27 of the sipe blade 26.

FIG. 6 shows a through-hole 28c as still another specific example. A diameter changes continuously from one end to the other end and the diameter is large in one surface of the sipe blade 26 and the diameter is small in the other surface of the sipe blade 26. The through-hole 28c is of a truncated conical shape (a conical shape without a vertex and a vicinity thereof). Accordingly, a surface 29c and a surface 25c of the through-hole 28c, respectively, on the mold inner side and the mold outer side are inclined with respect to the surface 27 of the sipe blade 26 in a direction to come closer to (or move apart from) each other. An acute angle portion 46c is formed between the surface 29c of the through-hole 28c on the mold inner side and the surface 27 of the sipe blade 26.

The through-hole 28 as above is preferably drilled at a location 1 to 3 mm away (including locations exactly 1 mm and 3 mm away) from the mold inner surface 30 in a direction perpendicular to the mold inner surface 30. That is, it is preferable that the through-hole 28 is drilled within a range of 1 to 3 mm both inclusive from the mold inner surface 30.

A diameter of the through-hole 28 is larger than 1 mm. That is, in a case where the diameter changes from one surface to the other surface of the sipe blade 26 as the through-hole 28c of FIG. 6, the smallest diameter is larger than 1 mm.

2. Manufacturing Methods of Tire Vulcanization Mold 10 and Sipe Blade 26

A manufacturing method of the tire vulcanization mold 10 is same as a method in the related art except for a manufacturing method of the sipe blade 26. That is, to describe the manufacturing method briefly, a die (also called a core) for a pneumatic tire provided with grooves, blocks, ribs, and so on is manufactured first from gypsum. Subsequently, metal, such as aluminum, is poured around the gypsum die. A metal mold appears when the gypsum die is broken and removed.

A manufacturing method of the sipe blade 26 begins by preparing a metal plate 26a. Subsequently, the through-holes 28 are drilled in the plate 26a. It is preferable to drill the through-hole 28 at a location 1 to 3 mm away form the mold inner surface 30. FIG. 7 through FIG. 10 show specific examples of a method of drilling the through-hole 28.

Figure 7:
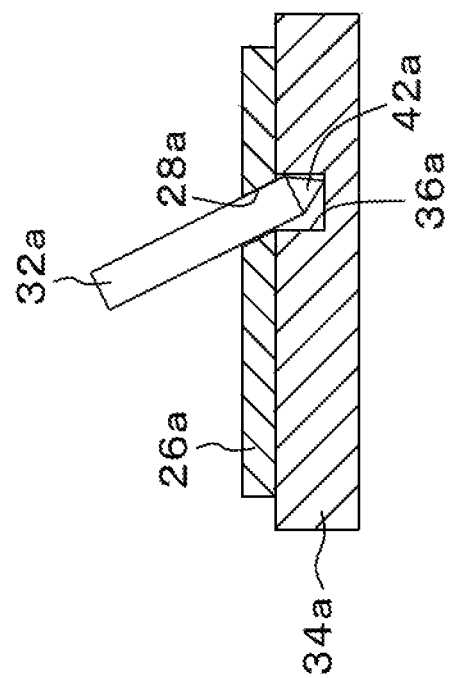

FIG. 7 shows a specific example of a method of drilling the through-hole 28a of FIG. 4. This example uses a drill 32a of a circular shape in cross section and having a pointed tip end coaxial with a center of the circle, and a backup plate 34a placed beneath the plate 26a. The drill 32a is of a cylindrical shape having a constant diameter except for a tapered portion 42a at a tip end. The backup plate 34a is provided with a hole 36a capable of receiving the tip end of the drill 32a. The drill 32a with the pointed tip end is passed through the plate 26a diagonally with respect to a surface of the plate 26a until the tapered portion 42a of the drill 32a completely penetrates through the plate 26a. The through-hole 28a having a constant diameter and inclined with respect to the surface of the plate 26a is thus drilled. The plate 26a is provided to protrude to the mold inner side from the mold inner surface 30. Consequently, the through-hole 28a of the sipe blade 26 has a constant diameter and is inclined with respect to the surface 27 of the sipe blade 26.

Figure 8:
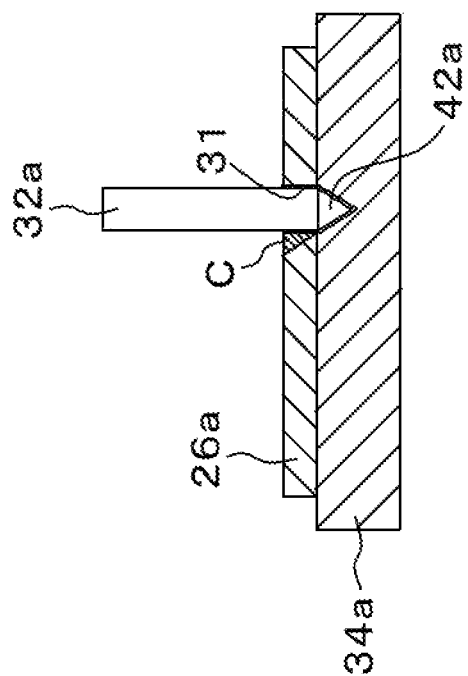
FIG. 8 is a view showing a method of drilling the through-hole 28b.

FIG. 8 shows an example of a method of drilling the through-hole 28b of FIG. 5. In this example, as is shown in FIG. 8, a prepared hole 31 having a constant diameter is drilled first by passing the drill 32a perpendicularly through the plate 26a until the tapered portion 42a of the drill 32a completely penetrates through the plate 26a. The backup plate 34a may be placed beneath the plate 26a when the prepared hole 31 is drilled. Subsequently, a portion of the prepared hole 31 at one opening end on the mold inner side (a portion indicated by a capital C in FIG. 8) is scraped off with a file or the like. The through-hole 28b shown in FIG. 5 which has the surface 29b on the mold inner side inclined with respect to the surface 27 of the sipe blade 26 is thus completed.

Figure 9A:
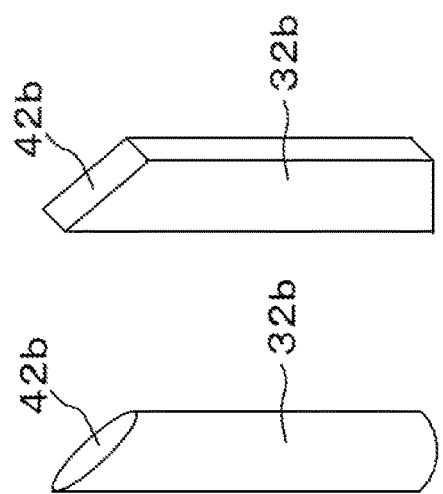
FIGS. 9A and 9B are views showing another method of drilling the through-hole 28b, FIG. 9A being a view showing a shape of a drill 32b and FIG. 9B being a view showing in which manner the through-hole 28b is drilled.
Figure 9B:
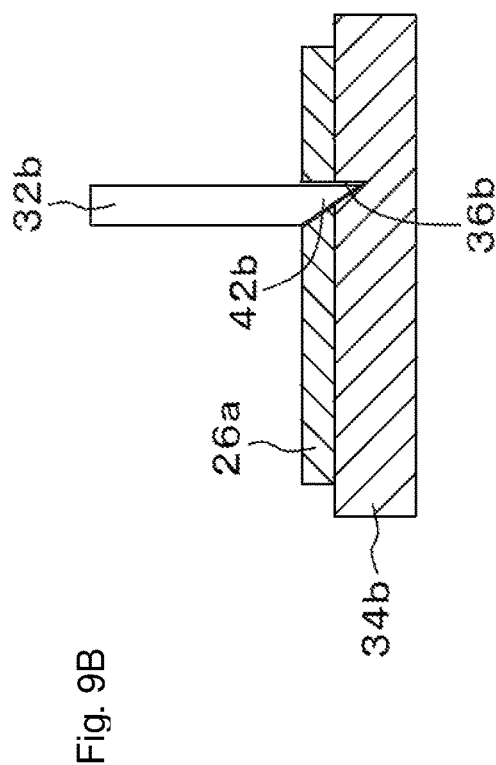

FIGS. 9A and 9B show another example of the method of drilling the through-hole 28b of FIG. 5. This example uses a drill 32b formed of a rod member of a circular or square shape in cross section with a diagonally cut tip end as is shown in FIG. 9A, and a backup plate 34b placed beneath the plate 26a. The backup plate 34b is provided with a hole 36b capable of receiving the tip end of the drill 32b. As is shown in FIG. 9B, the drill 32b is perpendicularly passed through the plate 26a and the drill 32b is stopped before a tapered portion (diagonally cut portion) 42b of the drill 32b penetrates through the plate 26a. Hence, a depth of the hole 36b in the backup plate 34b is set to a depth with which the tapered portion 42b of the drill 32b does not penetrate through the plate 26a when the tip end of the drill 32b reaches a bottom of the hole 36b. The plate 26a prepared as above is provided to protrude to the mold inner side from the mold inner surface 30. Consequently, as is shown in FIG. 5, the through-hole 28b of the sipe blade 26 has the surface 29b on the mold inner side inclined with respect to the surface 27 of the sipe blade 26.

Figure 10:
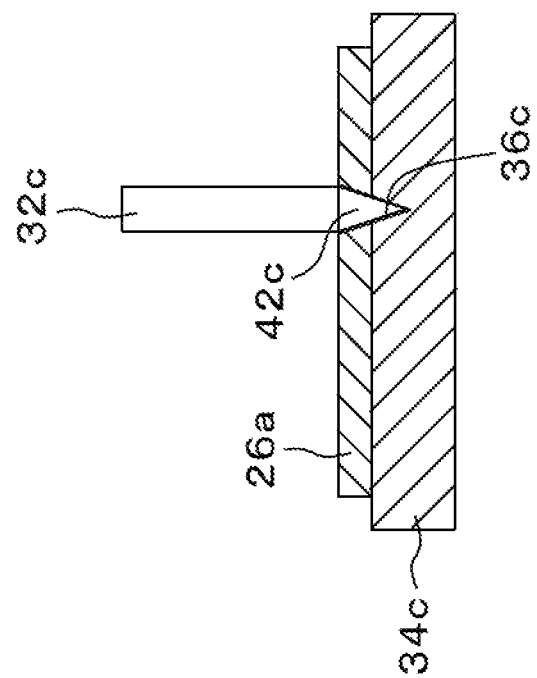
FIG. 10 is a view showing a method of drilling the through-hole 28c.

FIG. 10 shows an example of a method of drilling the through-hole 28c of FIG. 6. This example uses a drill 32c of a circular shape in cross section with a pointed tip end coaxial with a center of the circle, and a backup plate 34c placed beneath the plate 26a. The backup plate 34c is provided with a hole 36c capable of receiving the tip end of the drill 32c. The drill 32c is perpendicularly passed through the plate 26a and the drill 32c is stopped before a tapered portion 42c of the drill 32c penetrates through the plate 26a. Hence, a depth of the hole 36c of the backup plate 34c is set to a depth with which the tapered portion 42c of the drill 32c does not penetrate through the plate 26a when the tip end of the drill 32c reaches a bottom of the hole 36c. The through-hole 28c of a truncated conical shape is thus completed in the plate 26a (hence in the sipe blade 26).

The through-hole 28 of various shapes can be formed by methods other than the methods shown in FIG. 7 through FIG. 10 by changing a shape of the tip end of the drill and a direction through which the drill passes.

Figure 11A:
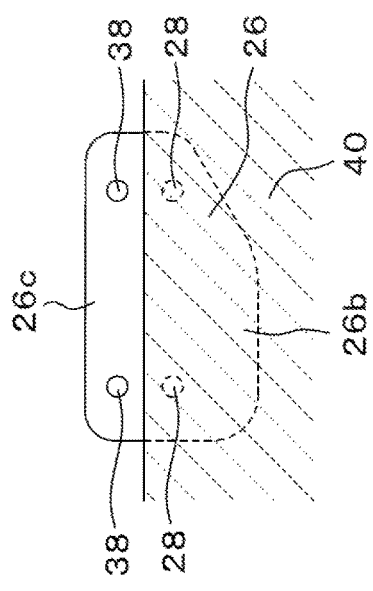
FIGS. 11A through 11C are views used to describe a method of fixing the sipe blade 26 to the tire vulcanization mold 10, FIG. 11A being a view when the sipe blade 26 is buried in a die 40, FIG. 11B being a view when metal 48 is poured into an outside of the die 40, and FIG. 11C being a view when the die 40 is removed.

Fixing holes 38 (see FIGS. 11A through 11C) are also drilled in the plate 26a separately from the through-holes 28. The fixing holes 38 only have to penetrate through the plate 26a and are not necessarily shaped as the through-holes 28.

In the sipe blade 26 completed in the manner as above, a portion including the through-holes 28 is a sipe forming portion 26b protruding to the mold inner side and a portion including the fixing holes 38 is a buried portion 26c buried in the metal forming the mold.

Figure 11B:
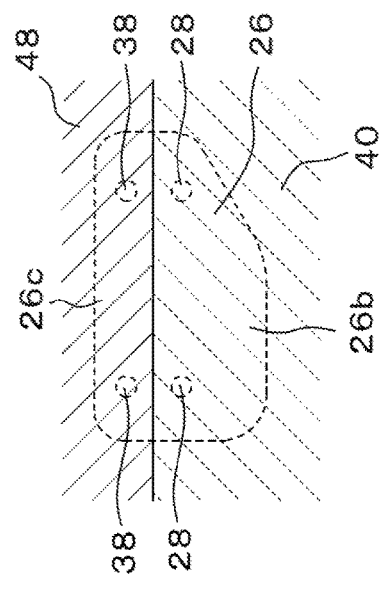
Figure 11C:
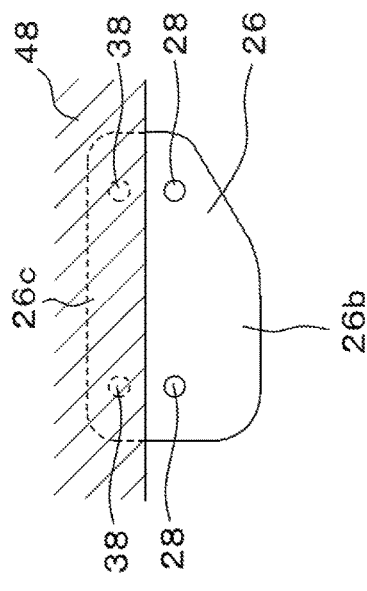

The sipe blade 26 completed as above is fixed to the tire vulcanization mold 10 as follows. That is, firstly, when a die 40 for a pneumatic tire is prepared from gypsum as described above, as is shown in FIG. 11A, the sipe forming portion 26b of the sipe blade 26 is buried in the gypsum die 40 while allowing the buried portion 26c to protrude to the outside of the mold 40. Subsequently as is shown in FIG. 11B, metal 48 is poured into the outside of the die 40. The metal 48 eventually flows into the fixing holes 38. When the metal 48 sets, the sipe blade 26 is fixed to the metal 48. Subsequently, by removing the gypsum die 40, as is shown in FIG. 11C, the tire vulcanization mold 10 having the sipe blade 26 with the sipe forming portion 26b protruding to the mold inner side is completed.

3. Function and Effect

When an unvulcanized tire is set in the tire vulcanization mold 10 and vulcanization molding starts, flowing rubber fills in the through-hole 28 as is shown in FIG. 12A. When the upper mold 12 is opened after the vulcanization molding ends, the sipe blade 26 is pulled in a direction to be extracted from a sipe 50 of the tire. A joint portion between rubber 44 which fills and sets in the through-hole 28 and a side wall of the sipe of the tire is cut by the acute angle portion 46a, 46b, or 46c (46b in FIGS. 12A and 12B) of the sipe blade 26. When the sipe blade 26 is extracted completely from the sipe 50, as is shown in FIG. 12B, the rubber 44 which fills and sets in the through-hole 28 falls off the through-hole 28 of the sipe blade 26 and remains in the sipe 50. Owing to the function as above, the rubber 44 hardly remains in the through-hole 28 of the sipe blade 26 when the tire is removed from the tire vulcanization mold 10.

Because the diameter of the through-hole 28 is larger than 1 mm, the rubber 44 which fills in the through-hole 28 is thick and hard to be torn off. However, the acute angle portions 46a, 46b, and 46c are formed between the respective surfaces 29a, 29b, and 29c of the through-hole 28 on the mold inner side and the surface 27 of the sipe blade 26 as described above, and the rubber 44 can be cut easily by the acute angle portions 46a, 46b, and 46c.

The through-hole 28 is provided with the purpose of releasing air remaining in a space between the sipe blade 26 and an unvulcanized tire to another place. Hence, the through-hole 28 is preferably drilled at a location close to the mold inner surface 30. Meanwhile, once rubber forming an unvulcanized tire makes contact with the mold inner surface 30, the rubber hardly moves. Given these circumstances, by drilling the through-hole 28 at a location 1 to 3 mm away from the mold inner surface 30, not only can air be released to another place, but rubber is also allowed to flow into the through-hole 28 where air is just released.

The through-hole 28 as above can be drilled by passing a drill through the sipe blade 26 diagonally with respect to the surface 27 of the sipe blade 26 or by passing a drill with a diagonal tip end through the sipe blade 26.

4. Modification

Figure 13:
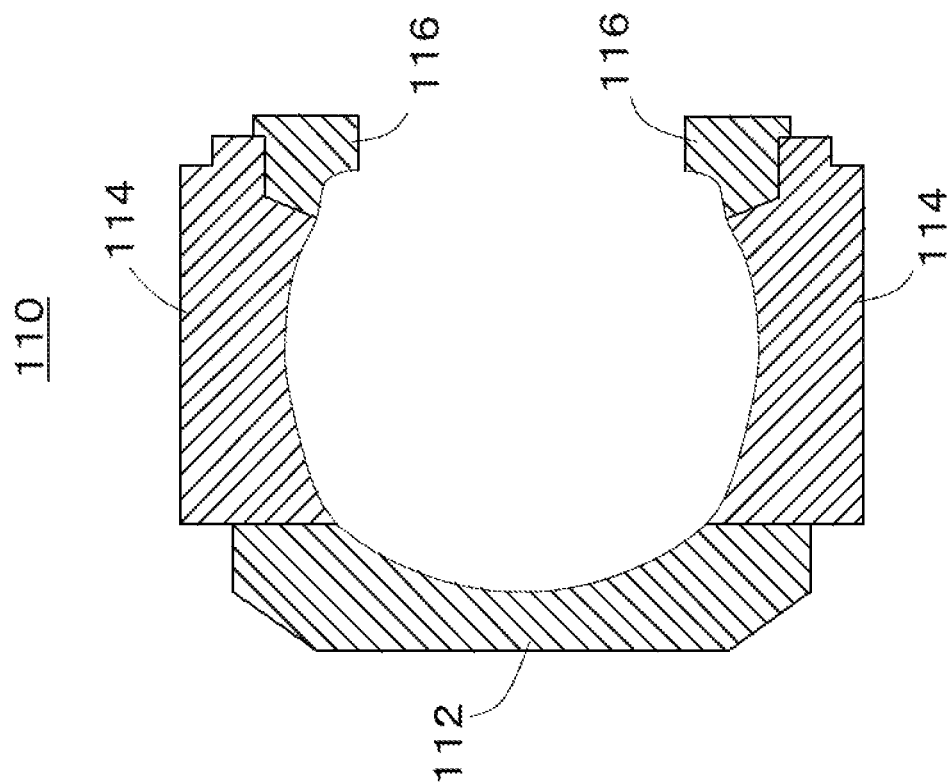
FIG. 13 is a half sectional view of a tire vulcanization mold 110 in a modification.
Figure 14A:
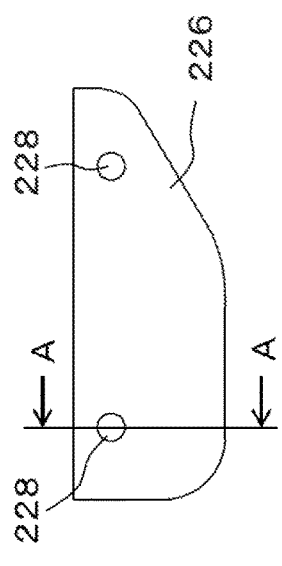
FIGS. 14A through 14C are views used to describe vulcanization molding using a mold in the related art, FIG. 14A being a view showing a sipe blade 226 viewed in a direction perpendicular to a surface thereof, FIG. 14B being a sectional view taken along the line A-A of FIG. 14A and showing fluidity of rubber in the vicinity of the sipe blade 226, and FIG. 14C being a sectional view taken along the line A-A of FIG. 14A and showing a state when a tire is removed after the rubber sets.
Figure 14B:
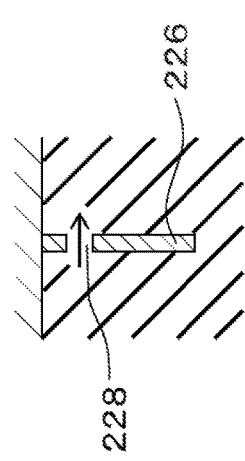
Figure 14C:
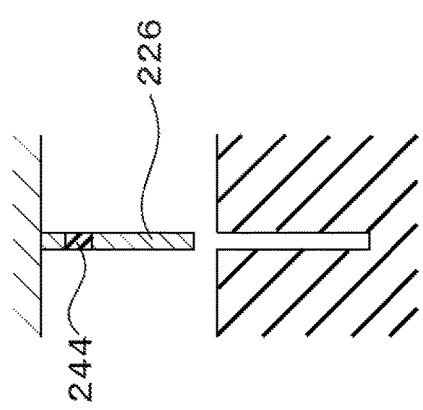

As is shown in FIG. 13, a tire vulcanization mold 110 may have multiple sectors 112 aligned on a periphery, a pair of annular side plates 114 provided at a top and a bottom of the multiple sectors 112, and a pair of bead rings 116 provided on an inner diameter side of the side plates 114. During vulcanization molding, an unvulcanized tire is set in the tire vulcanization mold 110, and the multiple sectors 112, a pair of the side plates 114, and a pair of the bead rings 116 chiefly shape a tread portion, a side portion, and a bead portion of the pneumatic tire, respectively. In the tire vulcanization mold 110 as above, the sipe blade 26 is provided to the sectors 112 shaping the tread portion.

The invention claimed is:

1. A tire vulcanization mold having a plate-like sipe blade that is used to form a sipe in a tread portion of a pneumatic tire, protrudes to a mold inner side from a mold inner surface, and is provided with a through-hole drilled to penetrate through the sipe blade, wherein an acute angle portion is formed between a first surface of the through-hole on the mold inner side and a surface of the sipe blade;

a diameter of the through-hole is larger than 1 mm, and a second surface of the through-hole closer than the first surface to the mold inner surface is orthogonal to the surface of the sipe blade.

2. The tire vulcanization mold according to claim 1, wherein:

the through-hole is drilled at a location 1 to 3 mm away from the mold inner surface.

* * * * *